United States Patent
Dang et al.

(10) Patent No.: US 6,937,422 B2
(45) Date of Patent: Aug. 30, 2005

(54) SELF-MONITORING AND SELF-HEALING OF FREQUENCY SPECIFIC POSITION ERRORS IN A DATA STORAGE DEVICE

(75) Inventors: Hien Phu Dang, Nanuet, NY (US); Mirei Hosono, Kanagawa-ken (JP); Naoyuki Kagami, Kanagawa-ken (JP); Kenji Okada, Kanagawa-ken (JP); Arun Sharma, New Rochelle, NY (US); Gordon James Smith, Rochester, MN (US); Sri M. Sri-Jayantha, Ossining, NY (US)

(73) Assignee: Hitachi Global Technologies Netherlands B.V., Amsterdam (NL)

( * ) Notice: Subject to any disclaimer, the term of this patent is extended or adjusted under 35 U.S.C. 154(b) by 261 days.

(21) Appl. No.: 10/289,603

(22) Filed: Nov. 7, 2002

(65) Prior Publication Data

US 2004/0090698 A1 May 13, 2004

(51) Int. Cl.⁷ .............................................. G11B 5/596
(52) U.S. Cl. ................................................... 360/77.02
(58) Field of Search ........................... 360/77.02, 77.04, 360/78.04

(56) References Cited

U.S. PATENT DOCUMENTS

| | | | |
|---|---|---|---|
| 5,612,845 A | * | 3/1997 | Smith .......................... 360/137 |
| 5,889,784 A | | 3/1999 | Rogers |
| 6,417,982 B1 | * | 7/2002 | Ottesen et al. ............ 360/77.02 |
| 6,469,861 B2 | * | 10/2002 | Onuki et al. .............. 360/77.02 |
| 6,587,293 B1 | * | 7/2003 | Ding et al. .................... 360/51 |
| 2003/0133220 A1 | * | 7/2003 | Hsin ........................ 360/77.04 |

* cited by examiner

*Primary Examiner*—David Hudspeth
*Assistant Examiner*—Mitchell R Slavitt
(74) *Attorney, Agent, or Firm*—Wood, Herron & Evans, L.L.P.

(57) ABSTRACT

An apparatus and method of controlling an actuator of a data storage device detect and/or correct narrowband mechanical excitations such as due to spindle bearing defects through sensing and/or rejecting disturbance frequencies associated with such narrowband mechanical excitations in an actuator control signal generated by a data storage device controller. A narrowband filter may be used to reject, from an actuator control signal generated by a data storage device controller, a disturbance frequency associated with a spindle bearing defect in a data storage device, and disposed in proximity to a zero crossover frequency associated with the data storage device controller. In addition, a peak filter disposed in a control loop of a data storage device controller may be configured to detect a spindle bearing defect in a data storage device by detecting an amplitude of a control signal in the control loop in proximity to a disturbance frequency associated with the spindle bearing defect.

58 Claims, 4 Drawing Sheets

SELF-MONITORING AND SELF-HEALING OF FREQUENCY SPECIFIC POSITION ERRORS IN A DATA STORAGE DEVICE

FIELD OF THE INVENTION

The present invention relates to data storage devices such as hard disk drives, optical drives, and the like. More particularly, it relates to detecting, correcting and reporting defects in the same.

BACKGROUND OF THE INVENTION

Data storage devices such as hard disk drives, optical drives, and the like typically utilize rotatable storage media from which data is read and/or to which data is written. A hard disk drive, for example, may be constructed using one or more disks of magnetic storage media coupled to a rotatable spindle supported by one or more bearings. An armature of a motor is coupled to the spindle is used to rotate the disk(s), while one or more actuators having read/write heads disposed at their ends are swept back and forth across the radii of the disks to read data from and/or write data to the disks. Similarly, an optical drive such as a CD-ROM or a DVD drive relies on a spinning optical disk and a radially-movable read/write head.

Regardless of the storage medium used, data is typically arranged into concentric tracks on the medium, and precise positioning of the actuator, and thus of the read/write head, by a servo system is typically required to ensure that the read/write head is positioned over the correct track on the storage medium.

Today there is an ever increasing demand on data storage capacity and access speed. These demands are fueled by the development of new processors that run faster and faster, executing more and more instructions per second. The programs containing these instructions have also become more voluminous, along with the data accessed by these programs. Consequently, data storage devices must also offer reduced access speed along with additional storage capacity.

One primary manner of increasing both storage capacity and access speed is through increasing track density, which is typically tracked in terms of tracks per inch (TPI). Increased track density allows more data to be stored on a given disk size. In addition, access time is also reduced since read/write heads do not need to be moved as far between tracks to read or write data.

As track density increases, however, greater positioning accuracy of an actuator is likewise required. Furthermore, vibrational effects such as mechanical vibrations and the like have a comparatively greater effect on alignment of a read/write due to the reduced spacing between adjacent tracks on a disk. As a result, significant development efforts have been directed to improving data storage device servo systems that control read/write head registration.

One particular area of concern is related to narrowband mechanical excitations of an actuator in a hard disk drive, which often result in increased nonrepeatable track misregistration (TMR), and consequently reduced disk drive performance. One such narrowband mechanical excitation stems relates to nonrepeatable runout (NRRO) effects from defects in the bearings used to rotatably support a drive spindle, e.g., where the bearings are Brinelled due to dents in the bearings' raceways. Such defects tend to generate a spindle excitation that is fixed in frequency, but still nonrepeatable due to a non-repeatable phase.

Due to mechanical coupling within the disk drive, NRRO excitations are ultimately detected by the drive's actuator servo controller, which adds spurious frequency components to the controller's control loop, and hampers the controller's ability to accurately position the actuator for proper track registration. As a result, the feedback to the controller, typically in the form of a Position Error Signal (PES), is exaggerated, which can result in misreads and write inhibits, and ultimately in reduced drive performance.

Furthermore, in some drive designs, the disturbance frequency resulting from NRRO mechanical excitation is near the open loop zero crossover frequency of a servo controller. As a result, the excitation is actually amplified by the servo controller, which further exaggerates the PES and reduces drive performance.

Another concern raised by NRRO and other mechanical excitations is an inability in conventional data storage devices to detect such excitations before they have an adverse impact on drive performance. Many hard disk drives, for example, include predictive failure analysis (PFA) functionality that attempts to detect potential defects in a drive prior to drive failure, so that a user can be notified of the defects in time to transfer any critical data to another data storage device and replace the failing drive. In fact, a number of hard disk drive manufacturers support a common reporting standard referred to as Self-Monitoring, Analysis and Reporting Technology (S.M.A.R.T.). While such functionality is often able to detect a number of potential defects, such functionality is not capable of detecting defects that cause NRRO and related mechanical excitations. As a result, progressive NRRO and other related mechanical excitations can ultimately be the cause of unexpected drive failures, and consequent loss of drive data.

Therefore, a significant need exists in the art for a manner of detecting and/or correcting for defects in a data storage device resulting from NRRO and other mechanical excitations.

SUMMARY OF THE INVENTION

The invention addresses these and other problems associated with the prior art by providing an apparatus and method of controlling an actuator of a data storage device in which narrowband mechanical excitations such as NRRO disturbances due to spindle bearing defects are detected and/or corrected through sensing and/or rejecting disturbance frequencies associated with such narrowband mechanical excitations in an actuator control signal generated by a data storage device controller.

Consistent with one aspect of the invention, for example, a filter may be used to reject, from an actuator control signal generated by a data storage device controller, a disturbance frequency associated with a spindle bearing defect in a data storage device.

Consistent with another aspect of the invention, a narrowband filter disposed in a control loop of a data storage device controller may be configured to reject a disturbance frequency from a control signal in the control loop that is in proximity to a zero crossover frequency associated with the data storage device controller.

Consistent with yet another aspect of the invention, a peak filter disposed in a control loop of a data storage device controller may be configured to detect a spindle bearing defect in a data storage device by detecting an amplitude of a control signal in the control loop in proximity to a disturbance frequency associated with the spindle bearing defect.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there are described exemplary embodiments of the invention.

DETAILED DESCRIPTION

The embodiments discussed hereinafter utilize narrowband filtering within a control loop of a actuator servo control to detect and/or correct defects associated with nonrepeatable runout (NRRO) and other narrowband mechanical excitations in a data storage device. While detection and correction are implemented in the hereinafter described embodiments, it will be appreciated that detection and rejection of such defects may be implemented independently from one another in some implementations, e.g., detection may simply be used to notify a system or user of a defect without any attempt to correct such a defect, or correction may be implemented without any runtime monitoring. Moreover, while the hereinafter described embodiments are implemented as hard disk drives, it will be appreciated that the principles of the invention may apply to other data storage devices that utilize rotatable storage media, including, for example, optical drives. The invention is therefore not limited to the specific embodiments discussed herein.

Prior to discussing a specific embodiment of the invention, a brief discussion of NRRO defects is provided herein. For example, turning to the Drawings, wherein like numbers denote like parts throughout the several views, FIG. 1 shows the propagation of mechanical excitations through an exemplary data storage device 10.

Figure 1:
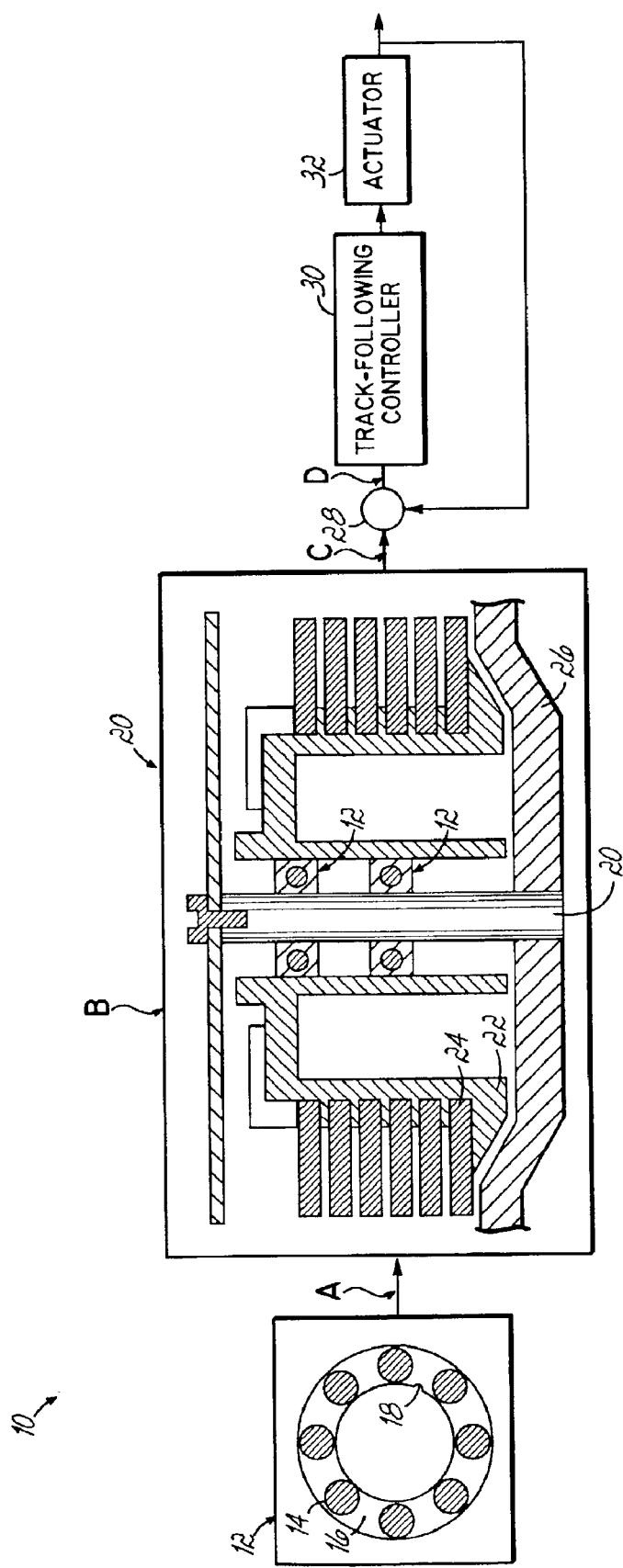
FIG. 1 is a block diagram illustrating spindle NRRO interaction with a servo controller in an exemplary data storage device.

In particular, FIG. 1 illustrates an exemplary spindle bearing 12, including a plurality of ball bearings 14 residing in a raceway 16. Mechanical bearings such as bearing 12 are susceptible to the formation of defects or deformities in the raceways, e.g., due to brinelling by the ball bearings. One such defect is illustrated diagrammatically at 18 in FIG. 1.

Figure 2A:
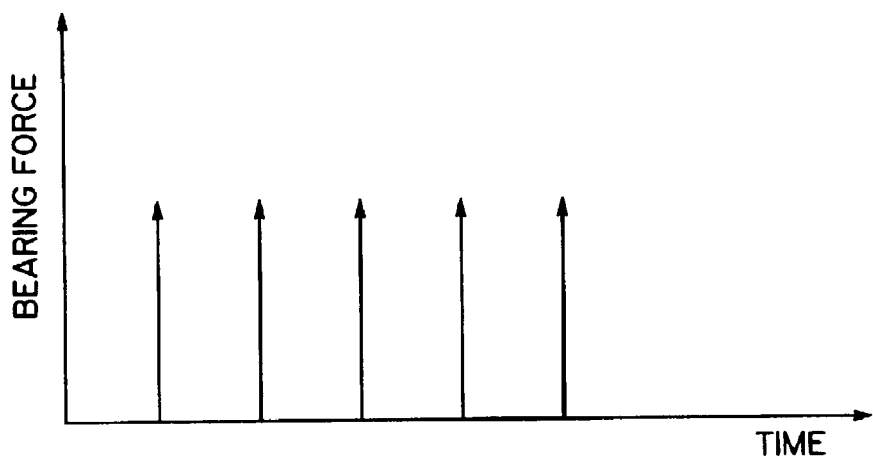
FIG. 2A is a graph of force over time taken at point A in FIG. 1.

It has been found that Brinelled bearings generate a mechanical excitation that is at a relatively stable disturbance frequency, i.e., the excitation is a relatively clean sinusoidal signal, although the amplitude and phase of the excitation may vary, and indeed may increase over time. Arrow A of FIG. 1, for example, represents the application of force between a bearing and a hub due to such an excitation, and FIG. 2A illustrates the periodic nature of the excitation via a graph of bearing force over time taken at point A of FIG. 1.

For example, in one commercially available 3.5 inch form factor 10,000 RPM server class disk drive, it has been found that the disturbance frequency of bearing-induced NRRO error is approximately 2978 Hz. While other drives, and other bearing designs, will generally have difference disturbance frequencies, typically it is the design of the bearing (e.g., the ball radius and the bearing diameter), and the speed or angular velocity of the drive, that dictate the disturbance frequency, irrespective of the magnitude, location and/or type of defect in the bearing.

Figure 2B:
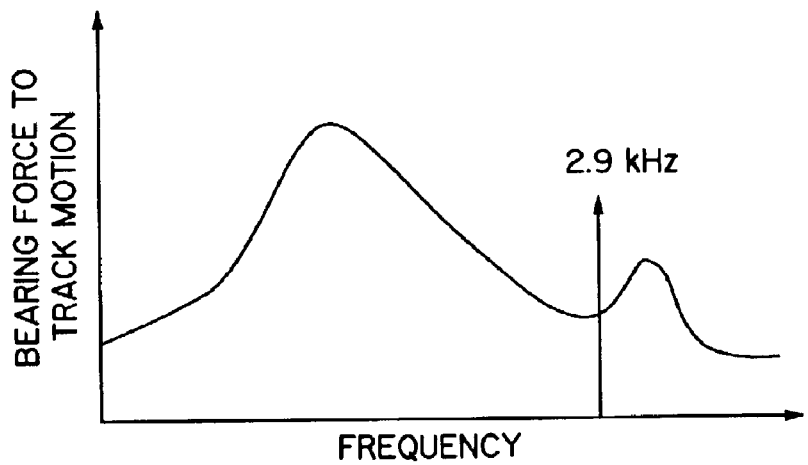
FIG. 2B is a graph of force-to-motion vs. frequency for the spindle mechanics at point B in FIG. 1.

Returning to FIG. 1, one or more bearings 12 are mounted intermediate a shaft 20 and a hub 22 upon which a plurality of magnetic disks 24 is mounted. A spindle motor (not shown) is used to rotate spindle mechanics, including hub 22 about shaft 20, the latter of which is fixedly mounted to a frame or housing 26 for the disk drive. As such, the excitation generated by a defective bearing 12 ultimately is conveyed to hub 22 and disks 24. FIG. 2B, for example, is an exemplary graph of bearing force to track motion vs. frequency for the spindle mechanics illustrated at point B in FIG. 1. In the graph, the 2.9 kHz disturbance frequency is shown superimposed over the normal frequency response of the spindle mechanics.

Figure 2C:
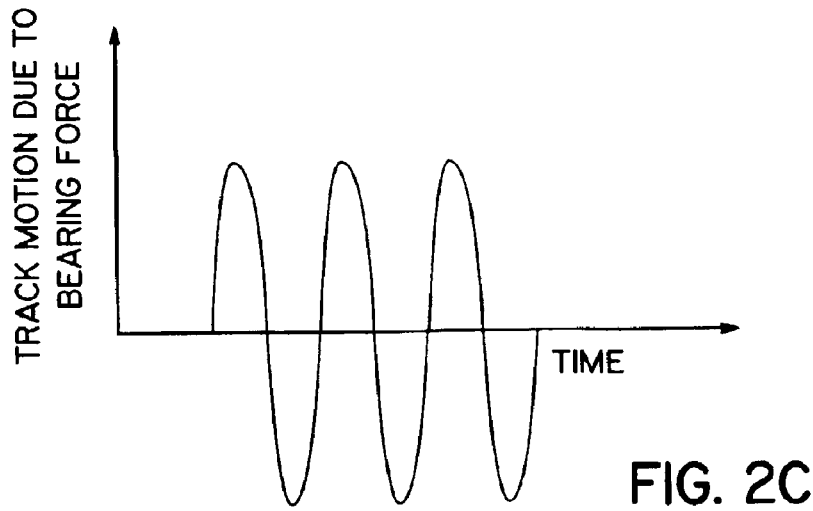
FIG. 2C is a graph of motion input over time taken at point C in FIG. 1.

The result of the conveyance of the excitation to the spindle mechanics is a periodic (i.e., fixed frequency) disturbance that is detected by the actuator servo system position error signal (PES), as shown in FIG. 2C by the exemplary graph of track motion due to bearing force over time taken at point C of FIG. 1. This disturbance is effectively summed at 28 with the PES feedback signal in the control loop of the servo system and fed as input to a track-following controller 30, which is used to generate a control signal that drives an actuator 32 upon which is disposed the read/write heads for the drive.

As such, the disturbance resulting from the NRRO mechanical excitation becomes an additional error component that must be corrected for by controller 30. Otherwise, misreads and/or write inhibits that can reduce drive performance may result.

It has also been found, however, that the NRRO mechanical excitation resulting from a Brinelled bearing often has a disturbance frequency that is in proximity to the zero crossover frequency for the track-following controller in the actuator servo system. In the aforementioned disk drive, for example, the zero crossover frequency is typically below 2 kHz, e.g., about 1.5 kHz, so a disturbance frequency of 2.9 kHz falls just above the zero crossover frequency, and hence within the rejection "bubble" for the controller transfer function (TF). As a result, the frequency component added to the PES by the mechanical excitation is actually amplified by the controller, which therefore accentuates the effects of the excitation. It has been found, for example, that the aforementioned disk drive may amplify the effects of an NRRO error by 2.5 times or more. As a result, the PES is exaggerated, which can induce further misreads and/or write inhibits that can significantly reduce drive performance.

Figure 2D:
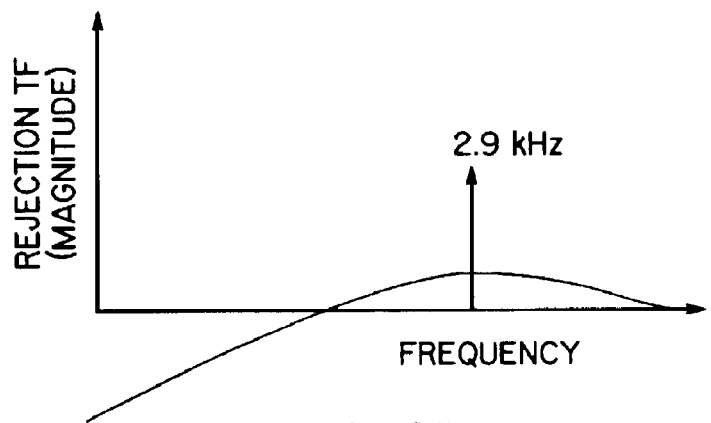
FIG. 2D is a graph of the frequency response of the servo controller in the data storage device of FIG. 1, taken at point D thereof.

FIG. 2D, for example, is a graph of the frequency response of the aforementioned track-following controller, taken at point D of FIG. 1, and illustrating the presence of the 2.9 kHz disturbance frequency within the rejection bubble for the transfer function of the controller.

Consistent with the invention, the effects of a NRRO mechanical excitation such as due to a Brinelled spindle bearing may be rejected from a data storage device servo controller using a narrowband rejection filter. Specifically, it has been found that the insertion of a narrowband rejection filter, such as a notch filter configured to reject the disturbance frequency associated with the NRRO mechanical excitation, in series with a track-following controller may be beneficial in eliminating the rejection bubble and thereby effectively rejecting the effects of the NRRO mechanical excitation. Moreover, it has been found that only minimal phase loss (e.g., less than about 2 degrees at the zero crossover frequency) typically results due to the use of a narrowband filter.

Figure 3:
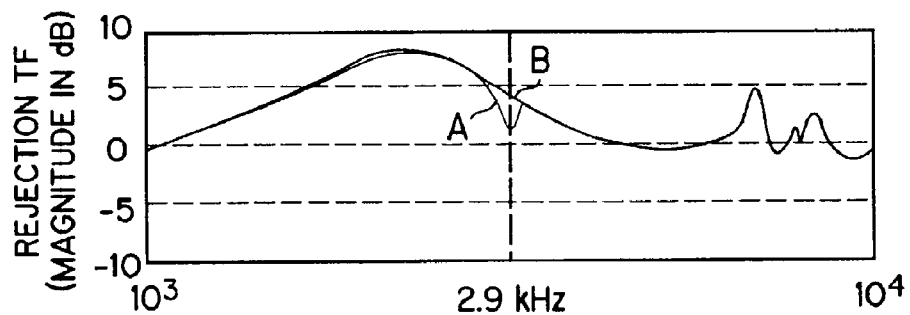
FIG. 3 is a graph of a transfer function for a data storage device servo controller before and after the addition of a narrowband filter to reject a mechanical excitation in a manner consistent with the invention.

FIG. 3, for example, illustrates for the aforementioned disk drive, an exemplary transfer function for a data storage device servo controller, both before (line B) and after (line A) the addition of a 3 dB narrowband filter to reject a mechanical excitation in a manner consistent with the invention. It has been found through experimentation that, through the addition of such a filter, a 4–5 times reduction in the number of write inhibit errors may result in some embodiments.

It will be appreciated that the principles of the invention may apply in other environments to address the effect of other sources of other mechanical excitations in a data storage device, and in particular other mechanical excitations that generate a disturbance frequency that lies in proximity to the zero crossover point for an actuator controller, and thus which are of the type that may be difficult to reject using conventional track following algorithms. Examples of other types of mechanical excitations include aerodynamic flutter of a suspension and/or of one or more disks, spindle driver-induced harmonics, etc.

Also consistent with the invention, disturbance frequency components arising due to NRRO mechanical excitations may also be detected in a data storage device, using a complementary bandpass filter such as a peak filter to isolate and monitor the magnitude of such components in a PES. As such, an electronic mechanism may be provided to detect the adverse effects of NRRO mechanical excitations.

As will become more apparent below, detection of disturbance frequency components due to NRRO mechanical excitations such as due to Brinelled spindle bearings may be used in a number of manners consistent with the invention. For example, such detection may be used in Predictive Failure Analysis (PFA) algorithms to predict potential drive failures, and/or may be used as a reporting mechanism such as in connection with System Monitoring and Reporting Technology (S.M.A.R.T.). In addition to, or as an alternative to such failure analysis and reporting, such detection may also be used to dynamically reject such components through selective control over the insertion of narrowband filtering into the servo control loop of a data storage device.

Figure 4:
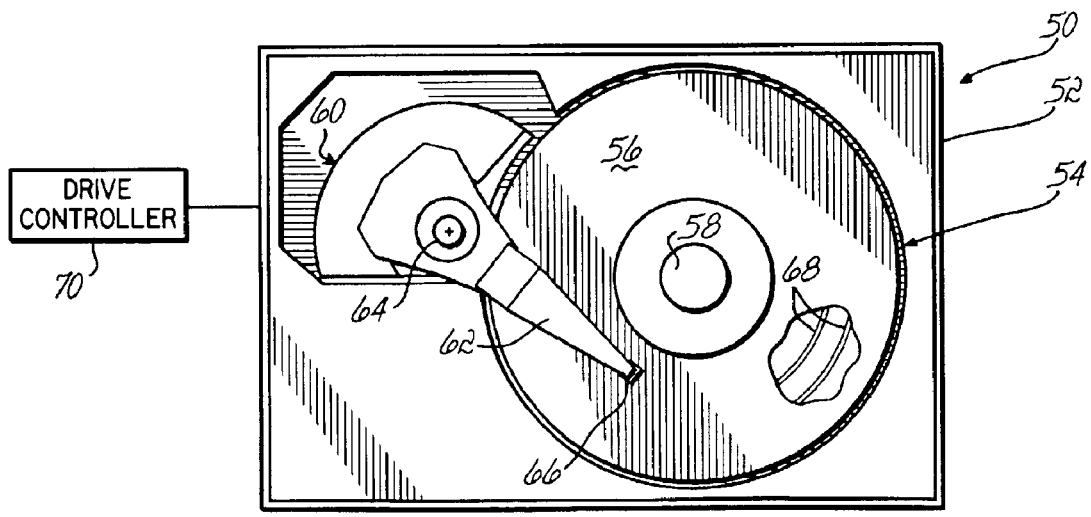
FIG. 4 is a top plan view of a data storage device incorporating a self-monitoring and self-healing controller consistent with the invention.

Referring now to FIG. 4, one specific embodiment of a self-monitoring and self-healing data storage device 50 consistent with the invention is shown. Device 50 as shown includes an frame or housing 52 within which is mounted a data transfer mechanism 54, e.g., a rotary disk drive type mechanism including one or more magnetic disks 56 mounted on a rotating hub or spindle 58, along with an actuator assembly 60 including one or more actuator arms 62 that rotate about a pivot point 64, and that include one or more read/write heads 66 disposed at the ends of the arms 62. However, other types of rotatable data transfer mechanisms could be used without departing from the spirit of the invention, e.g., optical, magneto optical, etc.

As is well known in the art, actuator assembly 60 is configured to sweep actuator arms 62 about pivot point 64 and across the surface of each disk 56 to align each read/write head 66 with a desired track 68 on the disk (greatly exaggerated in size in FIG. 4 for illustrative purposes). A data storage controller or drive controller 70, including a servo control loop (not shown in FIG. 4) is used to control the actuator assembly to precisely align each read/write head over the desired track on each disk.

Figure 5:
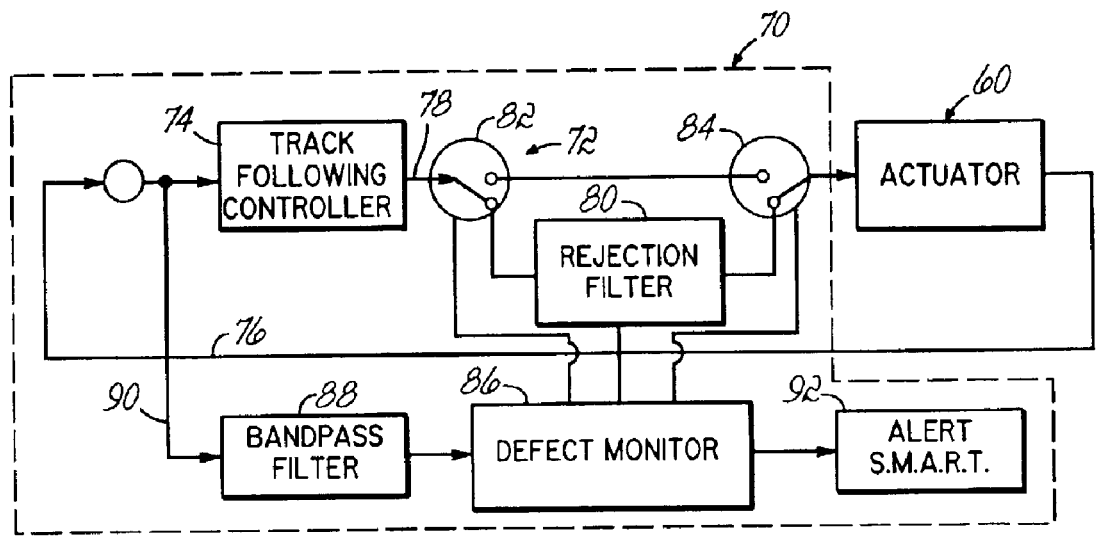
FIG. 5 is a block diagram of the controller of FIG. 4.
Figure 6:
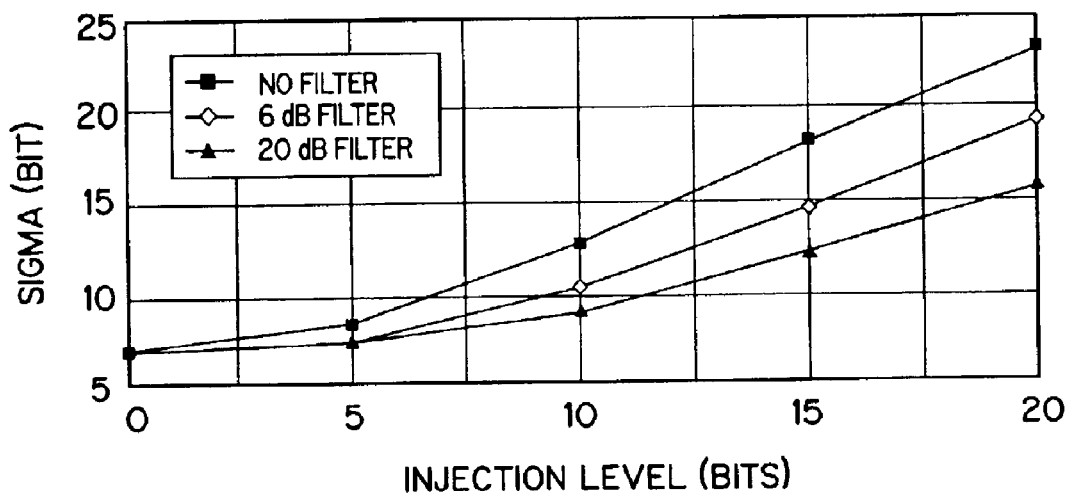
FIG. 6 is a graph of position error vs. defect level in an exemplary implementation using the controller of FIG. 5.

FIG. 5 illustrates drive controller 70 in greater detail. For simplicity's sake, only those components associated with actuator control and monitoring/reporting of NRRO defects are shown in the figure. It will be appreciated that other functionality associated with the electronic control of a disk drive will also typically be incorporated into controller 70, and/or into one or more additional electronic controllers coupled to controller 70.

Controller 70 includes, in part, a servo control loop 72 including a track following controller 74 that drives actuator 60. A PES signal from actuator 60 is fed back as shown at 76 to controller 74, which generates, in response thereto, an actuator control signal 78.

A rejection filter 80 is selectively insertable into control loop 72 by a pair of switches 82, 84, thus permitting filtering to be selectively applied to the actuator control signal output by controller 74 to actuator 60. While in some implementations, an analog or hybrid filter may be used for rejection filter 80, along with discrete switching devices for switches 82, 84, in the illustrated embodiment, filter 80 is implemented as a digital filter, whereby switches 82, 84 are merely diagrammatic constructs representing the selective application of digital filtering to a digitally-represented actuator control signal.

Control over switches 82, 84, and thus of the insertion of filter 80 into the control loop, is provided by a defect monitor 86, which receives as input the output of a peak filter 88 that receives the PES signal as shown at 90. As with rejection filter 80, peak filter 88 may be implemented as an analog or hybrid filter, although in the illustrated embodiment digital filtering is utilized for peak filter 88.

Both rejection filter 80 and peak filter 88 are typically implemented as narrowband filters configured to reject (for filter 80) or isolate (for filter 88) a specific disturbance frequency associated with a particular NRRO mechanical excitation. For example, when used in connection with the aforementioned disk drive wherein a NRRO mechanical excitation from a Brinelled spindle bearing has a disturbance frequency at about 2978 Hz, it is desirable for both filters 80, 88 to be centered on about 2978 Hz, and to have a bandwidth of about 50 to about 100 Hz. As noted above, however, different center frequencies and/or different bandwidths may be desirable for other NRRO mechanical excitations.

In some embodiments, it may be desirable to configure peak filter 88 to be active only during a track following mode for controller 70. As such, during seek operations, peak filter 88 would be deactivated or disabled.

Defect monitor 86 receives a peak filtered signal from peak filter 88 that may be analyzed to determine a relative magnitude of the disturbance frequency of interest. In response to this magnitude, defect monitor 86 is capable of performing a number of actions.

For example, it may be desirable to selectively and dynamically insert rejection filter 80 in control loop 72 to attenuate or reject the disturbance frequency components. It also may be desirable to dynamically control the level of attenuation of filter 80. Furthermore, it may be desirable to perform predictive analysis and/or generate a potential failure alert, e.g., by generating a S.M.A.R.T. alert as shown at 92.

As an example, it may be desirable for defect monitor 86 to define five levels of responsive actions based upon the magnitude of the disturbance frequency component of the PES, as shown below in Table I:

TABLE I

Defect Monitor Responsive Actions

| Level | Action | S.M.A.R.T. Alert |
|---|---|---|
| 1 | none | Brinelled spindle bearing detected - Level 1 |
| 2 | none | Brinelled spindle bearing detected - Level 2 |
| 3 | insert 6 dB filter | Brinelled spindle bearing detected and 6 dB filter inserted |
| 4 | insert 20 dB filter | Brinelled spindle bearing detected and 20 dB filter inserted, recommend drive replacement |
| 5 | insert 20 dB filter | Excessive NRRO, recommend immediate drive replacement |

Through appropriate polling of the S.M.A.R.T. alerts, a system may therefore have ample opportunity to take appropriate corrective actions, such as drive replacement, well prior to any drive failure.

While the invention has been illustrated by the description of the embodiments thereof, and while the embodiments have been described in considerable detail, it is not the intention of applicant to restrict or in any way limit the scope of the appended claims to such detail. Additional advantages and modification will readily appear to those skilled in the art. The invention in its broader aspects is therefore not limited to the specific details, representative apparatus and method, and illustrative examples shown and described. Accordingly, departure may be made from such details without departing from the spirit or scope of applicants' general inventive concept.

What is claimed is:

1. An apparatus, comprising:
   a data storage device controller configured to control an actuator in a data storage device, wherein the data storage device controller includes a filter configured to reject a disturbance frequency associated with a spindle bearing defect in the data storage device from an actuator control signal generated by the data storage device controller.

2. The apparatus of claim 1, wherein the disturbance frequency is within a rejection bubble disposed above a zero crossover frequency associated with the data storage device controller.

3. The apparatus of claim 1, wherein the filter is a narrowband filter selected from the group consisting of a digital notch filter, an analog filter, and a hybrid filter.

4. The apparatus of claim 1, wherein the data storage device controller further includes a second narrowband filter disposed in the control loop and configured to reject a second disturbance frequency associated with a bearing cage in the data storage device.

5. An apparatus, comprising:
   a data storage device controller configured to control an actuator in a data storage device, wherein the data storage device controller includes a filter configured to reject a disturbance frequency associated with a spindle bearing defect in the data storage device from an actuator control signal generated by the data storage device controller, wherein the data storage device controller is further configured to detect an amplitude of the actuator control signal in proximity to the disturbance frequency.

6. The apparatus of claim 5, wherein the data storage device controller is further configured to selectively enable the filter in response to the detected amplitude of the actuator control signal.

7. The apparatus of claim 6, wherein the data storage device controller is further configured to select from among a plurality of attenuations for the filter in response to the detected amplitude of the actuator control signal.

8. The apparatus of claim 5, wherein the data storage device controller is further configured to report a potential error in response to the detected amplitude of the actuator control signal.

9. The apparatus of claim 1, wherein the data storage device controller is further configured to dynamically determine the disturbance frequency.

10. A method of controlling a data storage device, the method comprising:
    (a) generating an actuator control signal that controls an actuator in the data storage device; and
    (b) rejecting a disturbance frequency associated with a spindle bearing defect in the data storage device from the actuator control signal.

11. The method of claim 10, wherein the disturbance frequency is within a rejection bubble disposed above a zero crossover frequency associated with a data storage device controller that generates the actuator control signal.

12. The method of claim 10, wherein rejecting the disturbance frequency is performed by a narrowband filter selected from the group consisting of a digital notch filter, an analog filter, and a hybrid filter.

13. The method of claim 10, further comprising rejecting a second disturbance frequency associated with a bearing cage in the data storage device from the actuator control signal.

14. A method of controlling a data storage device, the method comprising:
    (a) generating an actuator control signal that controls an actuator in the data storage device;
    (b) rejecting a disturbance frequency associated with a spindle bearing defect in the data storage device from the actuator control signal; and
    (c) detecting an amplitude of the actuator control signal in proximity to the disturbance frequency.

15. The method of claim 14, further comprising selectively enabling the rejection of the disturbance frequency in response to the detected amplitude of the actuator control signal.

16. The method of claim 15, wherein rejection of the disturbance frequency is performed by a filter, the method further comprising selecting from among a plurality of attenuations for the filter in response to the detected amplitude of the actuator control signal.

17. The method of claim 14, further comprising reporting a potential error in response to the detected amplitude of the actuator control signal.

18. The method of claim 10, further comprising dynamically determining the disturbance frequency.

19. An apparatus, comprising:
(a) a data storage device controller including a control loop configured to control an actuator in a data storage device; and
(b) a narrowband filter disposed in the control loop and configured to reject a disturbance frequency from a control signal in the control loop in proximity to a zero crossover frequency associated with the data storage device controller.

20. The apparatus of claim 19, wherein the disturbance frequency is associated with a defect in a spindle bearing in the data storage device.

21. The apparatus of claim 19, wherein the disturbance frequency is above the zero crossover frequency associated with the data storage device controller.

22. The apparatus of claim 21, wherein the disturbance frequency is within a rejection bubble associated with the data storage device controller.

23. The apparatus of claim 19, wherein the narrowband filter comprises a digital notch filter.

24. The apparatus of claim 19, wherein the narrowband filter comprises an analog filter.

25. The apparatus of claim 19, wherein the narrowband filter comprises a hybrid filter.

26. The apparatus of claim 19, wherein the narrowband filter is selectable between a plurality of attenuations.

27. The apparatus of claim 19, further comprising a second narrowband filter disposed in the control loop and configured to reject a second disturbance frequency in proximity to the zero crossover frequency.

28. The apparatus of claim 26, wherein the second disturbance frequency is associated with a bearing cage in the data storage device.

29. The apparatus of claim 19, further comprising a peak filter disposed in the control loop and configured to detect an amplitude of the control signal in proximity to the disturbance frequency.

30. The apparatus of claim 29, further comprising a monitoring circuit configured to selectively enable the narrowband filter in response to the detected amplitude of the control signal.

31. The apparatus of claim 30, wherein the monitoring circuit is further configured to select from among a plurality of attenuations for the narrowband filter in response to the detected amplitude of the control signal.

32. The apparatus of claim 29, further comprising a monitoring circuit configured to report a potential error in response to the detected amplitude of the control signal.

33. The apparatus of claim 19, wherein the data storage device controller is further configured to dynamically determine the disturbance frequency and configure the narrowband filter in response thereto.

34. The apparatus of claim 19, further comprising a data storage device selected from the group consisting of a hard disk drive, a floppy drive, and an optical disk drive.

35. The apparatus of claim 19, further comprising an integrated circuit within which the data storage device controller and narrowband filter are disposed.

36. A program product, comprising the data storage device controller and narrowband filter of claim 19, and a signal bearing medium, wherein the data storage device controller and the narrowband filter are defined by a hardware definition program resident on the signal bearing medium, and wherein the signal bearing medium includes at least one of a recordable medium and a transmission medium.

37. A method of controlling a data storage device, the method comprising:
(a) in a control loop of a data storage device controller, generating a control signal that controls an actuator in the data storage device; and
(b) rejecting a disturbance frequency from the control signal using a narrowband filter disposed in the control loop, wherein the disturbance frequency is in proximity to a zero crossover frequency associated with the data storage device controller.

38. The method of claim 37, wherein the disturbance frequency is associated with a defect in a spindle bearing in the data storage device.

39. The method of claim 37, wherein the disturbance frequency is within a rejection bubble disposed above the zero crossover frequency associated with the data storage device controller.

40. The method of claim 37, further comprising rejecting a second disturbance frequency from the control signal using a second narrowband filter disposed in the control loop, wherein the second disturbance frequency is associated with a bearing cage in the data storage device.

41. The method of claim 37, further comprising detecting an amplitude of the control signal in proximity to the disturbance frequency using a peak filter disposed in the control loop.

42. The method of claim 41, further comprising selectively enabling the narrowband filter in response to the detected amplitude of the control signal.

43. The method of claim 41, further comprising selecting from among a plurality of attenuations for the narrowband filter in response to the detected amplitude of the control signal.

44. The method of claim 41, further comprising reporting a potential error in response to the detected amplitude of the control signal.

45. The method of claim 37, further comprising dynamically determining the disturbance frequency and configuring the narrowband filter in response thereto.

46. An apparatus, comprising:
(a) a data storage device controller including a control loop configured to control an actuator in a data storage device; and
(b) a peak filter disposed in the control loop and configured to detect a spindle bearing defect in the data storage device by detecting an amplitude of a control signal in the control loop in proximity to a disturbance frequency associated with the spindle bearing defect.

47. The apparatus of claim 46, wherein the disturbance frequency is above a zero crossover frequency and disposed within a rejection bubble associated with the data storage device controller.

48. The apparatus of claim 46, further comprising a narrowband filter disposed in the control loop and configured to reject the disturbance frequency from the control signal in the control loop.

49. The apparatus of claim 48, further comprising a monitoring circuit configured to selectively enable the narrowband filter in response to the detected amplitude of the control signal.

50. The apparatus of claim 49, wherein monitoring circuit is further configured to select between a plurality of attenuations for the narrowband filter.

51. The apparatus of claim 46, further comprising a monitoring circuit configured to report a potential error in response to the detected amplitude of the control signal.

52. The apparatus of claim 46, wherein the data storage device controller is further configured to dynamically determine the disturbance frequency and configure the peak filter in response thereto.

53. The apparatus of claim 46, wherein the peak filter is selectively activated during a track following mode of the controller, and selectively deactivated during performance of a seek operation.

54. A method of controlling a data storage device, the method comprising:
(a) in a control loop of a data storage device controller, generating a control signal that controls an actuator in the data storage device; and
(b) detecting a spindle bearing defect in the data storage device by detecting an amplitude of the control signal in the control loop in proximity to a disturbance frequency associated with the spindle bearing defect using a peak filter disposed in the control loop.

55. The method of claim 54, further comprising rejecting the disturbance frequency from the control signal using a narrowband filter disposed in the control loop.

56. The method of claim 55, further comprising selectively enabling the narrowband filter in response to the detected amplitude of the control signal.

57. The method of claim 56, further comprising selecting between a plurality of attenuations for the narrowband filter in response to the detected amplitude of the control signal.

58. A method of controlling a data storage device, the method comprising:
(a) in a control loop of a data storage device controller, generating a control signal that controls an actuator in the data storage device;
(b) detecting a spindle bearing defect in the data storage device by detecting an amplitude of the control signal in the control loop in proximity to a disturbance frequency associated with the spindle bearing defect using a peak filter disposed in the control loop; and
(c) reporting a potential error in response to the detected amplitude of the control signal.

* * * * *